Jan. 5, 1965

V. H. SALATHIEL 3,164,413

WHEEL BALANCER

Filed Aug. 12, 1963

VIRGIL H. SALATHIEL
*INVENTOR.*

BY

*Robert K. Rhea*
AGENT

United States Patent Office 3,164,413
Patented Jan. 5, 1965

3,164,413
WHEEL BALANCER
Virgil H. Salathiel, Oklahoma City, Okla., assignor to Todd Engineering Co., Inc., Oklahoma City, Okla., a corporation of Oklahoma
Filed Aug. 12, 1963, Ser. No. 301,376
3 Claims. (Cl. 301—5)

The present invention relates to vehicles and more particularly to an automatic wheel balancer for vehicles.

The present invention is a continuation-in-part of an application filed by me in the United States Patent Office on April 5, 1962, under Serial Number 185,268 for Wheel Balancer now abandoned.

Various means have been used to balance vehicle wheels. The more common type of wheel balancing means is static balancing by the use of lead weights which are clamped to the rim portion of the wheel and requires the service of experienced mechanics and special equipment. Such weights are frequently lost or misplaced when repairing or changing the tires. Therefore, it will be readily understood that a large percentage of vehicles are operated with unbalanced wheels which cause vibration of the vehicle, uneven wear of the tires, excessive wear of the bearings and steering mechanism and other parts of the vehicles.

The prior art reveals a number of attempts to achieve a dynamic balance for wheels or rotating bodies. The devices shown by the prior art feature the use of globular weights contained by an annulus, some of which are filled with fluid. Some of the reasons why the devices of the prior art are unsatisfactory are the weights are formed of relatively small soft material, such as lead shot, which tend to pile up in groups in the annulus or, being small, their movement is restricted or hampered by the fluid filling the remaining portion of the annulus. Such weights wear or become flattened and thus fail to respond to an out of balance condition of the wheel or body. When no fluid is used the movement of the weights, particularly when using weights of substantial size with respect to the size of the annulus, is too rapid and thus do not maintain a dynamic balance under variations of acceleration or deceleration.

It is, therefore, the principal object of this invention to provide a device which is adapted to be connected to the rim portion of a vehicle wheel to provide a dynamic balance of the wheel and compensate for tire distortion and out-of-roundness and mud lodged or caked on the wheel or gravel and the like picked up by the tire tread while traveling along a highway.

A similar object is to provide a wheel balancing device which supplements the balance of a static balanced wheel wherein conventional lead weights have been used to achieve the static balance.

Another object is the provision of a device of this class which may be readily attached to the rim portion of the vehicle wheel on either the inwardly or outwardly disposed side of the wheel.

Still another object is the provision of a wheel balancer featuring globular weights and a weight dampening fluid wherein the weights are automatically positioned to maintain vehicle wheels in a dynamic balanced condition by centrifugal force while the fluid dampener prevents sudden undesired shifting of the weights in response to a shock or force applied to the wheel or tire.

Still another object is to provide a wheel balancing device in which the balancing means is redistributed, after each stop of the vehicle, each time the vehicle reaches a certain velocity.

A further object is the provision of a device of this class which is not hampered in its operation by changing the position of the tire with respect to the wheel, as for example when repairing a flat tire.

Yet another object is to provide a wheel balancer which may be easily moved from one wheel to another of the same size.

The present invention accomplishes these and other objects by connecting an endless tube, containing a selected quantity of globular weights and fluid, to the rim of a vehicle wheel.

Other objects will be apparent from the following description when taken in conjunction with the accompanying single sheet of drawings, wherein.

Like characters of reference designate like parts in those figures of the drawings in which they occur.

In the drawings.

Figure 2:
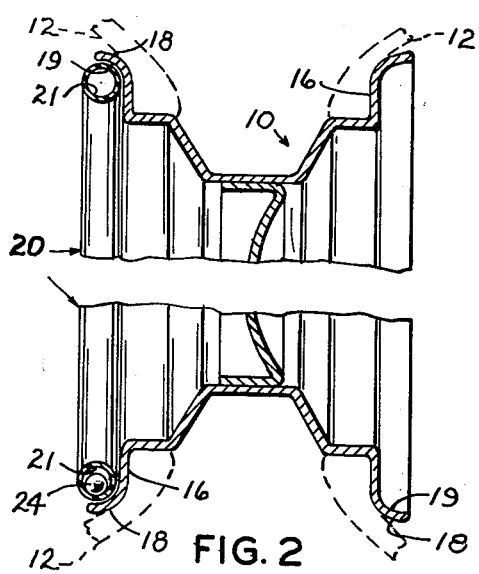
FIGURE 2 is a fragmentary vertical cross-sectional view taken substantially along the line 2—2 of FIG. 1.
Figure 1:
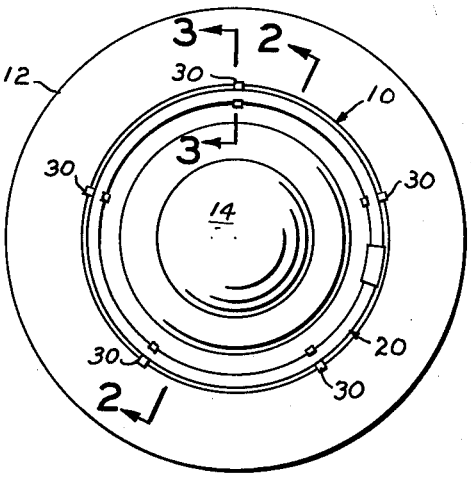
FIGURE 1 is a side elevational view of a conventional vehicle wheel having a tire mounted thereon.

The reference numeral 10 indicates a conventional vehicle wheel having a tire 12 mounted thereon while a hubcap 14 covers the axle portion of the wheel. The wheel 10 is provided with tire bead engaging flanges 16, each having an outwardly directed arcuately curved portion 18 forming an annular recess 19.

Figure 4:
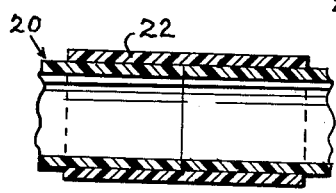
FIGURE 4 is a fragmentary vertical cross-sectional view illustrating the preferred manner of joining the ends of the tube; and, FIGURE 5 is a graph illustrating the efficiency of the instant invention when compared with conventionally balanced and unbalanced wheels.

In carrying out the invention I provide an elongated tubular member 20, having its ends abutted and joined in the manner shown by FIG. 4. A sleeve 22 surrounds and is bonded by a chemical welding action to the adjacent end portions of the tube 20 thus forming an endless tube. It is important that the bore of the sleeve fit the periphery of the tube without restricting the size of the bore of the latter and that the end surfaces of the tube remain in close contact throughout the life of the latter for the reasons which will be apparent.

It is also important that the inner periphery of the annular tube 20, at the juncture of its ends, be free of any obstruction which might be formed by joining the ends.

Diametrically the endless tube 20 is substantially equal to the diameter defined by the recess 19, formed by the arcuate flange 18, so that the tube 20 may be easily positioned therein.

Figure 3:
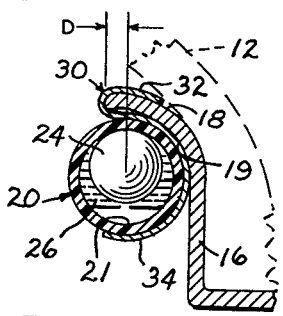
FIGURE 3 is a fragmentary cross-sectional view taken substantially along the line 3—3 of FIG. 1.

As shown in FIG. 3, the toric axis of the tube 20 is offset inwardly of the outer limit of the wheel flange 18 a distance D.

In its preferred form for passenger cars the tube 20 is preferably formed of plastic material, namely, cellulose acetate butyrate, substantially ½ inch outside diameter and three-eighths inch inside diameter. This material was chosen because the oil base fluid 26, to be described later, does not bleed through the walls of the tube whereas other materials tested, such as polyethylene, permitted a loss of fluid by seepage through its walls.

The annulus 20 forms an interior cavity 21 and prior to joining the ends of the tube a quantity of weights, preferably in the form of 5/16 inch diameter steel balls 24, are placed within the tube. The quantity of steel balls used varies with the size of the vehicle wheel. It is important that these balls 24 be formed of steel or at least of a material which does not readily wear and form flat spots on the periphery thereof. I have found that lead shot or balls tend to flatten or achieve an ovate shape when used on the vehicle under normal driving conditions a longer period of time than is required for 4,000 miles of usage.

Furthermore, common lead balls or pellets are not uniform spherical in shape and are, therefore, not as easily moved by centrifugal force around the tube cavity 21 to achieve a dynamic balance. The preferred size, 5/16 inch diameter, of the balls 24, when usd in 3/8 inch inside diameter tubes applied to passenger cars, results in a to'erence or space between the ball and the interior wall of the cavity 21 of 1/16 inch. The quantity of balls used, when in point contact with each other, extend approximately 1/3 of the circumferential distance of the tube. The most satisfactory balancing result for a 14 inch passenger car wheel has been obtained wherein the quantity of balls used is 60 balls. 28 of these balls weigh two ounces.

After inserting the balls 24, a quantity of special dampening fluid 26 is placed within the cavity 21. The quantity of fluid used, in combination with the area displaced by the balls 24, preferably fills the cavity 3/4 full. The dampening fluid 26 used has specifications similar to automatic transmission fluid and is as follows: API specific gravity 33.0; pour point 43.5 at 60° F.; total carbon residue 0.001%; initial boiling point 275° F.; viscosity index 101.52 and kinematic viscosity 11.89 cs. at 100° F. and 2.89 cs. at 210° F. The viscosity of the fluid 26 in combination with the tube and ball sizes retards the movement of the balls thus preventing any sudden weight shift by an impact of the tire on an object. I have found it desirable that the diameter of the balls be greater than one-half the diameter of the cavity 21 to prevent piling up of the balls. Also it is essential that the tube not be completely filled with the fluid for the reason that, when the tube is full of the fluid, the movement of the balls is retarded by the viscosity of the fluid to such an extent that a dynamic balance of the wheel cannot easily be obtained.

The tube 20 is preferably maintained in place within the recess 19 by a plurality, preferably five, relatively thin and transversely narrow strap metal clips or clamp members 30. The clamps 30 are substantially S-shaped when viewed in side elevation or longitudinal cross section (FIG. 3). One end portion 32 of each clamp 30 is formed to tightly grip opposing side surfaces of the wheel flange 18 while the opposite end portion 34 of each clamp is arcuately curved to contiguously surround slightly more than one-half the circumference of the tube 20. As shown in FIG. 3, the arcuately curved portion 34 of the clamp faces outwardly of the wheel and the central portion of the S-shaped clamp substantially conforms to the cross sectional shape of the recess 19. The clips 30 are preferably hardened by heat treating so that when installed they firmly grip the wheel flange 18 and tube 20.

Figure 5:
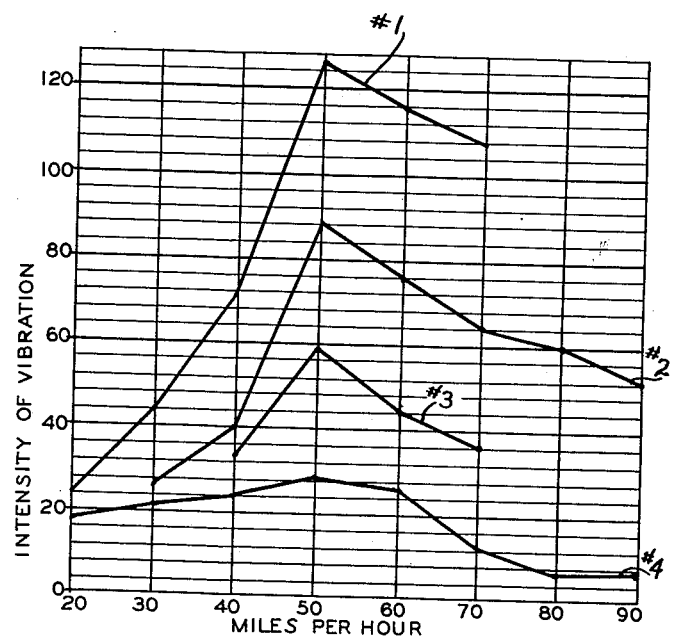

FIGURE 5 illustrates the results of tests depicting the efficiency of a wheel balanced with the instant invention as compared with a conventional static balanced wheel and an unbalanced wheel. Intensity of vibration, graduated in 4 unit spaces is plotted as ordinate against miles per hour as abscissa graduated in 10 unit spaces. These curves were plotted using a conventional popular priced 1961 model automobile having a 14 inch wheel. The left rear driving wheel was mounted on rollers with a vibration intensity pickup.

Curve #1 indicates the vibrations of the wheel with a two ounce unbalancing lead weight attached to the tire. The vibrations in this trial ranged from a value of 24 units at 20 m.p.h. to 126 units at 50 m.p.h., decreasing to 108 units at 70 m.p.h.

In curve #2 the same two ounce unbalancing lead weight was used and the plastic tube 20 filled with a thin fluid, commonly referred to as a solvent solution, and sixty 5/16 inch balls 24 was connected to the wheel rim. The wheel now vibrated at the rate of 26 units at 30 m.p.h. and rose to a maximum of 89 units at 50 m.p.h. with a sharp decrease in intensity of vibration as the velocity of the vehicle increased, falling to 52 units at 90 m.p.h.

Curve #3 indicates the vibration tendency of a conventional static balanced wheel ranging from 33 units at 40 m.p.h. to a maximum of 58 units at 50 m.p.h. and decreasing to a value of 35 units at 70 m.p.h.

Curve #4 indicates the results of using the same wheel unbalanced with a 5 ounce lead weight placed opposite the conventional valve stem and having one of the plastic tubes 20 filled approximately 1/3 full with the balls 24 and having the remaining cavity filled approximately 3/4 full with the fluid 26 installed in place. The curve ranges from 17 units at 20 m.p.h. to a maximum of 31 units at 50 m.p.h. A gradual decrease in vibration then occurred to a value of 25 units at 60 m.p.h. Vibration then decreased more rapidly to a value of 14 units at 70 m.p.h., reaching a minimum of 7 units at 80 m.p.h. and climbing back to a value of 7 3/4 units at 90 m.p.h.

Further testing and improvement of the instant invention has shown that the most satisfactory dynamic balancing of various automotive wheels is achieved by first static balancing each wheel and then installing one of the balancers of the instant invention on the inside rim of each wheel. Five specific tests using 3/8 inch inside diameter tubes 20 with 5/16 inch diameter steel balls 24 and the fluid 26, described hereinabove follow. The term "balance" or "balanced" refers to dynamic balanced condition.

Test #1

The ring 20 was filled approximately 1/3 full of steel balls 24 and the remaining annulus was completely filled with the fluid 26.

Results: Balanced pretty good at speeds below 40 m.p.h.; above 40 m.p.h. would not balance and on most automobiles tested created a higher intensity of vibration than conventional static balancing.

Test #2

The ring 20 was filled approximately 1/3 full of steel balls 24 and fluid 26 was added to the annulus so that the cavity 21 was approximately 3/4 full.

Results: Balanced at all speeds from 10 m.p.h. to 120 m.p.h.

Test #3

The ring 20 was filled approximately 1/3 full of steel balls 24 and fluid 26 was added to the annulus so that the cavity was approximately 1/2 full.

Results: Balanced at all speeds up to 60 m.p.h.; above 60 m.p.h., balance would come and go, indicating insufficient quantity of oil to properly dampen the movement of the balls 24.

Test #4

The ring 20 was filled approximately 1/3 full of steel balls 24. No fluid was added. The remaining portion of the cavity 21 contained air under atmospheric pressure.

Results: Would not balance at any speed; indicating dampening fluid 26 was necessary to maintain the balls 24 in balancing position.

Test #5

Small shot, in quantity equal to the weight of the steel balls 24 in the above tests, was placed in the ring 20 and the remaining annulus was completely filled with the fluid 26.

Results: Would not balance at any speed.

Other tests, similar to Test #5, were conducted in which the small shot was varied in quantity from approximately half the weight of the steel balls used to approximately two ounces more than the weight of the balls and the results of these tests were similar to the result of Test #5 in that the wheels would not balance at any speed.

Operation

In operation a tube 20, containing a selected number of balls 24 and sufficient fluid 26 so that the cavity 21 is approximately 3/4 full, is installed on the inside rim of each, preferably static balanced, wheel of the vehicle as explained hereinabove. When the vehicle is at rest, the balls 24 gravitate toward the downwardly disposed portion of the tube. Movement of the vehicle starts the balls moving, partially retarded by the viscosity of the fluid, around the cavity 21 of the annulus 20 and at a velocity between 8 and 20 miles per hour, centrifugal force evenly distributes the fluid 26 along the outer wall surface defining the inner periphery of the tube while a portion of the balls will automatically be distributed, by centrifugal force, along that portion of the inner periphery of the tube which is diametrically opposite a heavy portion of the tire or wheel thus achieving dynamic balance of the tire and wheel. This results in an air space evenly distributed around the cavity 21 opposite the position of the fluid 26 and an even distribution of the remaining balls 24. Each time the vehicle is stopped the balls gravitate toward the bottom of the tube to repeat the cycle when the vehicle is again put in motion.

Obviously the invention is susceptible to some change or alteration without defeating its practicability, and I therefore do not wish to be confined to the preferred embodiment shown in the drawings and described herein, further than I am limited by the scope of the appended claims.

I claim:

1. In a dynamic wheel balancing attachment the combination with a vehicle wheel having a rim and a tire mounted thereon, said rim having a peripheral flange turned arcuately outward and forming an annular recess on the outer surface of said rim, of: an endless ring formed of cellulose acetate butyrate and having a circular cross section throughout its entire periphery with the radius of the cross section substantially smaller than the cross section radius of the out-turned flange forming the annular recess, the overall diameter of said ring being slightly greater than the inside diameter of the annular recess formed by said flange, whereby the axis of the toric diameter of said ring is offset, inwardly of the wheel, with respect to the axis of the diameter formed by the point of radius of the annular recess, the cavity in the interior of the ring being of uniform size and of circular formation throughout the entire length of the ring; clip means interposed between and gripping said ring and said out-turned flange for holding said ring within the annular recess formed by said out-turned flange; a quantity of steel balls of relatively large mass disposed and freely movable within the annulus of said ring, the diameter of said steel balls being greater than one-half the cross section diameter of the annulus of said ring, said balls, when positioned in point contact with each other, extending through and occupying substantially one-third of the circumferential distance of the annulus of said ring; and a fluid of relatively low viscosity, in combination with the balls, filling substantially three-quarters of the annulus of said ring, the viscosity of said fluid and its incomplete filling of the annulus of said ring forming an evenly distributed air space along the periphery of said ring and permitting movement of said balls and an even distribution of the fluid around the balls along the inner periphery of the ring providing a dampening effect against quick movement of said balls, whereby centrifugal force disperses said low viscosity fluid and said steel balls around said ring in wheel and tire balancing position, said steel balls having a higher density than the fluid.

2. The structure as defined in claim 1 wherein said ring includes abutting end portions surrounded by a sleeve which is bonded to the abutting end portions of the ring.

3. The structure as defined in claim 1 wherein the fluid has the following approximate characteristics and specifications: A.P.I. specific gravity 33.0, pour point 43.5 at 60° F.; total carbon residue 0.001%; initial boiling point 275° F.; viscosity index 101.52, and kinematic viscosity 11.89 cs. at 100° F. and 2.89 cs. at 210° F.

References Cited in the file of this patent

UNITED STATES PATENTS

| | | |
|---|---|---|
| 1,314,005 | Louden | Aug. 26, 1919 |
| 2,687,918 | Bell et al. | Aug. 31, 1954 |
| 2,771,240 | Gurin | Nov. 20, 1956 |
| 2,781,942 | Eastburg | Feb. 19, 1957 |
| 2,801,883 | Householder | Aug. 6, 1957 |
| 2,812,215 | Waite | Nov. 5, 1957 |
| 3,006,690 | Pierce | Oct. 31, 1961 |
| 3,035,958 | Wilkins | May 22, 1962 |